(12) United States Patent
Bhanage et al.

(10) Patent No.: US 10,880,856 B2
(45) Date of Patent: Dec. 29, 2020

(54) SYNCHRONIZING TARGET WAKE TIME WITH SCANNING WINDOW FOR DETERMINING CLIENT LOCATION

(71) Applicant: Cisco Technology, Inc., San Jose, CA (US)

(72) Inventors: Gautam Dilip Bhanage, Milpitas, CA (US); Pooya Monajemi, Irvine, CA (US); David Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/290,135

(22) Filed: Mar. 1, 2019

(65) Prior Publication Data
US 2020/0280950 A1  Sep. 3, 2020

(51) Int. Cl.
*H04W 52/02* (2009.01)
*H04W 64/00* (2009.01)
*H04W 8/00* (2009.01)

(52) U.S. Cl.
CPC ......... *H04W 64/003* (2013.01); *H04W 8/005* (2013.01); *H04W 52/0216* (2013.01); *H04W 52/0229* (2013.01)

(58) Field of Classification Search
CPC ........... H04W 64/003; H04W 52/0216; H04W 8/005; H04W 52/0229
See application file for complete search history.

(56) References Cited

U.S. PATENT DOCUMENTS

| | | | |
|---|---|---|---|
| 2013/0308618 A1* | 11/2013 | Panneerselvam | G01S 5/14 370/338 |
| 2015/0063190 A1* | 3/2015 | Merlin | H04L 1/1887 370/312 |
| 2015/0103767 A1* | 4/2015 | Kim | H04W 74/008 370/329 |
| 2016/0269993 A1* | 9/2016 | Ghosh | H04W 52/0229 |
| 2017/0180963 A1* | 6/2017 | Cavendish | H04W 52/0229 |
| 2019/0045438 A1* | 2/2019 | Cariou | H04W 52/0219 |
| 2019/0253967 A1* | 8/2019 | Xiao | H04W 28/0289 |

OTHER PUBLICATIONS

Cisco Sytems, Inc., "Cisco Hyperlocation Solution", https://www.cisco.com/c/en/us/products/collateral/interfaces-modules/aironet-hyperlocation-module-advanced-security/datasheet-c78-734901.html, Jan. 2019, 3 pages.

* cited by examiner

*Primary Examiner* — Sithu Ko
*Assistant Examiner* — Malick A Sohrab
(74) *Attorney, Agent, or Firm* — Edell, Shapiro & Finnan, LLC

(57) ABSTRACT

Presented herein are methodologies for setting a target wake time for a wireless client that is being served by an access point, wherein the access point also performs scanning for locating the wireless client. The methodology includes determining a start time of a time window for scanning, e.g., for locations of respective wireless clients, setting a target wake time of a given wireless client, among the wireless clients, based on the start time of the time window for scanning respective wireless clients, and wirelessly communicating the target wake time to the given wireless client.

18 Claims, 6 Drawing Sheets

SYNCHRONIZING TARGET WAKE TIME WITH SCANNING WINDOW FOR DETERMINING CLIENT LOCATION

TECHNICAL FIELD

The present disclosure relates to controlling the timing of target wake time (TWT) to be co-extensive with a scanning window of, e.g., a client location determining system.

BACKGROUND

Target Wake Time (TWT) is a mechanism first specified in 802.11ah, and further enhanced in the 802.11ax wireless LAN standard that allows clients to negotiate their sleep times and wake up intervals with their serving access points (APs). The main purpose of the TWT feature is to help stagger wake up times of multiple clients rather than having each client wake up after a beacon and contend, all at once, for medium access. Chipset vendors are implementing the TWT feature such that the clients waking up in a basic service set (BSS) can be grouped for minimal contention or optimal communication (using, e.g., orthogonal frequency-division multiple access (OFDMA), multi-user (MU), etc. schemes based on traffic patterns).

DESCRIPTION OF EXAMPLE EMBODIMENTS

Overview

Presented herein are techniques for setting a target wake time for a wireless client that is being served by an access point, wherein the access point also performs periodic scanning, e.g., for locating the wireless client. The techniques include determining a start time of a time window for scanning respective wireless clients, setting a target wake time of a given wireless client, among the wireless clients, based on the start time of the time window for scanning respective wireless clients, and wirelessly communicating the target wake time to the given wireless client.

A device or apparatus is also described. The device may include an interface unit configured to enable network communications, a memory, and one or more processors coupled to the interface unit and the memory, and configured to: determine a start time of a time window for scanning, e.g., for locations of respective wireless clients, set a target wake time of a given wireless client, among the wireless clients, based on the start time of the time window for scanning respective wireless clients, and wirelessly communicate the target wake time to the given wireless client.

Example Embodiments

Figure 1:
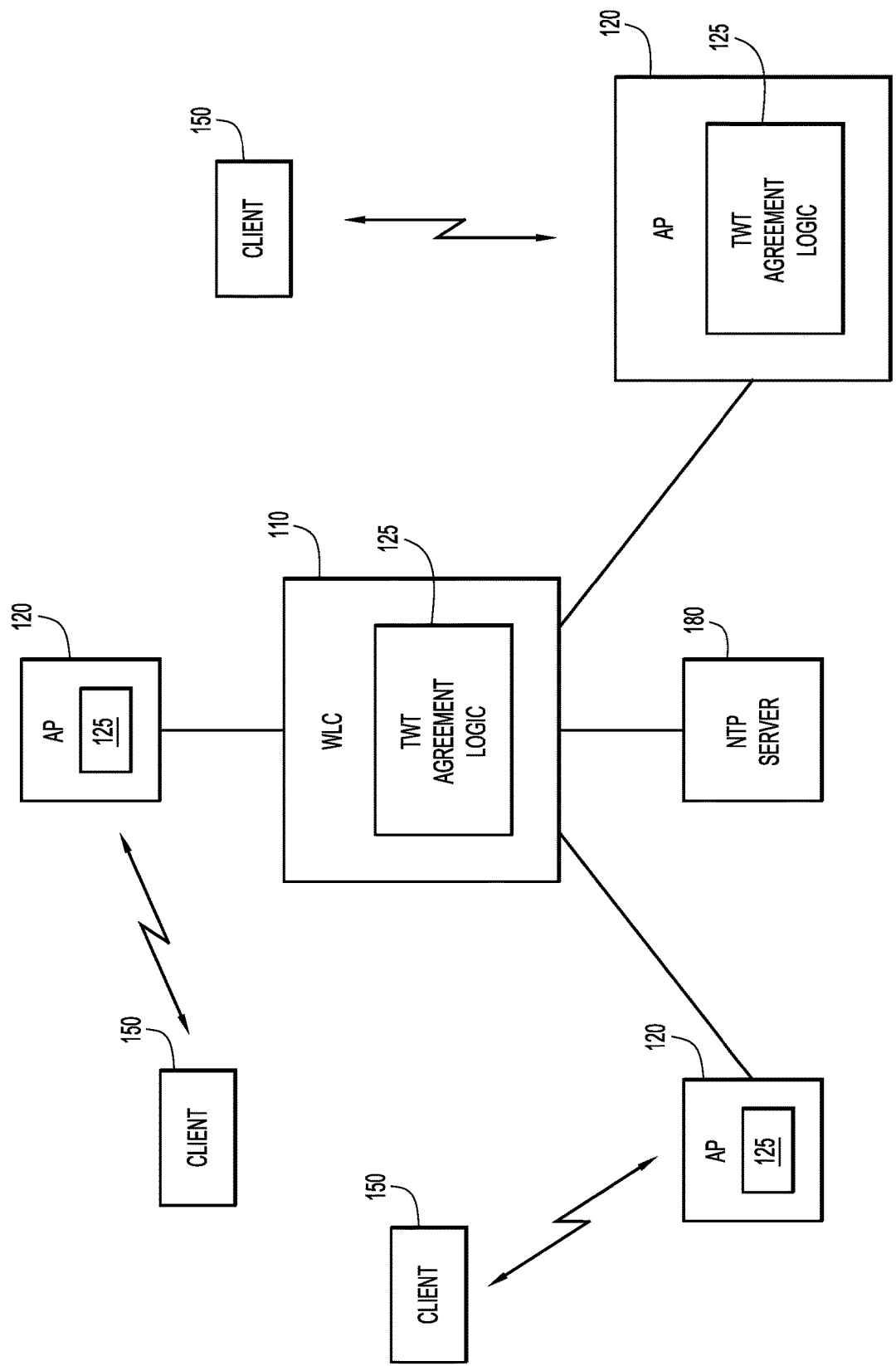
FIG. 1 depicts components of a wireless network in which TWT agreement logic may be deployed in accordance with an example embodiment.

FIG. 1 depicts components of a wireless network in which TWT agreement logic 125 may be deployed in accordance with an example embodiment. More specifically, a wireless local area network (LAN) controller (WLC) 110 controls a plurality of access points (APs) 120. A given AP 120 communicates wirelessly with a given mobile client 150, such as a smart phone, tablet computer, or laptop computer, among other possible WiFi enabled devices, to provide, e.g., Internet access to the client 150. As shown, TWT agreement logic 125, which will be described in detail below, may be deployed on the WLC 110 itself, or may be deployed in one, some, or all of the APs 120. Also shown in FIG. 1 is network time protocol (NTP) server 180, which will also be described later herein.

In some implementation, APs 120 may be configured to find or to determine the location of a client 150 by using high accuracy location (HALO) services, such as those available from Cisco Systems, Inc. (San Jose, Calif.) in the form of, e.g., Cisco's Hyperlocation Solution. Such a location solution relies on having more than one AP with a radio on the channel of a serving AP at the same time to improve the location accuracy. That is, multiple APs are employed to help determine the location of a given client. Conventionally, HALO scans are agnostic to any power save mechanism used by client 150 in that a client 150 might wake up every DTIM beacon, when interested in group addressed traffic, and a HALO scan might last multiple beacon intervals, but, notably, the client 150 is not required to wake up and it is certainly not ensured that the client 150 will transmit a sufficient amount to take the measurements while it is awake. However, with the adoption of the 802.11ax standard, and based on a TWT agreement between a given client 150 and its serving AP 120, the given client 150 might not wake up during the HALO scan to perform the expected scanning frame exchange with the serving AP 120. This undesirable scenario could result in either degraded location information or no location information being generated at all for clients that are not awake during HALO scan periods.

To address such an undesirable scenario, instead of negotiating TWT agreements based purely on the objective of reduction of medium contention and improving client battery life, embodiments described herein additionally consider HALO scan information available at every AP as a basis for negotiating the TWT agreements. Consequently, an AP 120 can ensure that clients 150 are awake and perform a frame exchange with the AP 120 during the HALO scans. In order to achieve this goal, the TWT windows are negotiated with clients 150 in a manner such that their wake times align within scheduled HALO scans. The HALO scan intervals themselves are also chosen to simplify the alignment problem.

In accordance with the disclosed embodiments, the timing negotiated in TWT agreements are restructured such that:
1. They align in time within HALO scans;
2. They still cause minimal contention between clients during the HALO scans; and
3. They impose a minimal change on a given client's wake up interval such that their wake up times align.

It is noted that there is a tradeoff between a client's quality of service (QoS) performance, location accuracy, and battery life impact when the TWT wake up interval is negotiated. In consideration of that tradeoff, embodiments described herein may employ configurable threshold(s) to align TWT wake up intervals based on client types, traffic patterns, MAC addresses, etc. that enable customized TWT negotiations for optimal client performance.

The approaches disclosed herein function with both unicast and broadcast TWT agreements.

Finally, it is noted that it is possible in accordance with the disclosed embodiments to selectively change TWT agreements for clients, i.e., not change all TWT agreements made by a given client.

Figure 2:
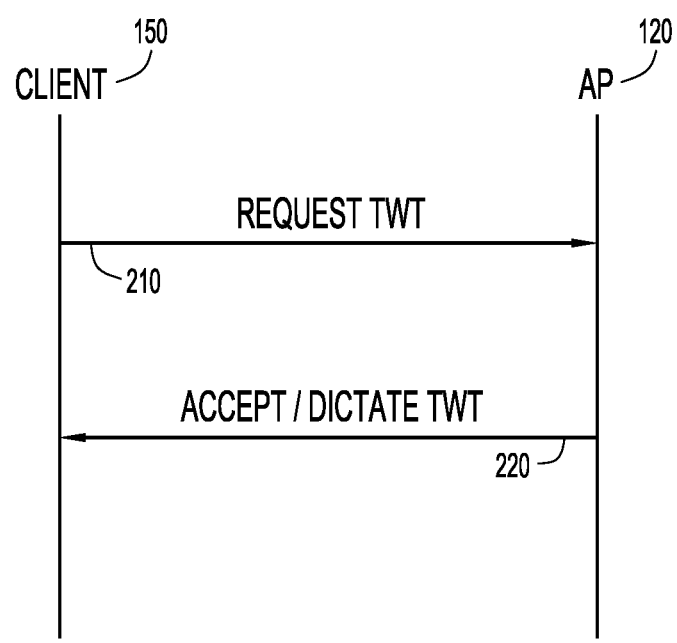
FIG. 2 shows a sequence diagram in which a given client requests a TWT and an AP accepts the request, or dictates (or alternatively suggests) another TWT or related parameters, in accordance with an example embodiment.

The embodiments described herein are primarily focused on scanning for location determination. However, those skilled in the art will appreciate that scanning could be for other purposes such as determining the presence of a given wireless device or making other periodic measurements on the wireless device. Also, "scanning" by an AP may comprise receiving transmitted information, transmitting information, or a combination thereof Target Wake Time—Parameters Parameters that are negotiated, by, e.g., TWT agreement logic 125, as a part of TWT agreement include: (1) Target wake time—the time in μsec for which the requestor station (STA) will be awake, (2) Wake interval—this indicates the time interval between TWT wake periods, (3) TWT Channel—active channel used, and (4) TWT protection—use of protection mechanism used such as RTS/CTS. These parameters may be negotiated as depicted in FIG. 2 where a given client 150 requests a TWT 210 and the AP 120 accepts the request or dictates (or suggests) 220 another TWT or related parameters.

In the instant embodiments, TWT agreement logic 125 is particularly concerned with the calculation of: (1) the time when the client wakes up for the first time—so that the client wake time is suitably placed within the HALO scan window and (2) the wake interval—this ensures that the client wakes up during HALO scans. The selection of other parameters of the TWT agreement are not impacted by the consideration of HALO scan timing. Thus, the parameters determined according to the methodology set forth below, may be provided to client 150 in a frame exchange like that shown in FIG. 2.

Target Wake Time—Agreement Types

The 802.11ax standard supports two types of TWT agreements: (1) Broadcast TWT agreements, which are used for scheduling a group of stations; and (2) Unicast TWT agreements, which are made with a single station, but may align with other stations. A STA that requests and negotiates a TWT agreement will interact with the AP in the TWT service period (SP) and work only with high efficiency, trigger based, protocol packet data units (HE TB PPDUs). The following description is focused primarily on unicast implicit TWT agreements. However, those skilled in the art will appreciate that the same mechanism can also function in the context of broadcast TWT agreements.

Scheduler Design for Aligning TWTs with HALO Wake Times

At a high level, the approach on the described embodiments is to (1) select a TWT start time to align the client wakeup time such that its phase aligns suitably within a scheduled HALO scan window; and (2) select a TWT wake up interval value closest to the one favored by the client such that it wakes up periodically within the HALO scan window, i.e., align its frequency with the HALO schedule. The discussion below explains an approach in the context of unicast TWT agreements for clients.

TWT Scheduler Design (Step 0) Time Units for HALO Scans

In order to ensure alignment of a client's TWTs with the HALO scans, the HALO scan is expressed in the same duration units as the TWT interval. The TWT interval is expressed as follows: mantissa×2^(exponent) μsecs.

Thus, in the simplest case, the system administrator, or a system automation function may configure the HALO scans with a scan interval that is a power of 2. That is, an administrator may enter a selected "x" for configuring a HALO scan of 2^x μsecs. This value can also be automatically configured by rounding the provided scan interval to the closest power of 2.

Parameters for the HALO scan are denoted as follows:
1. The HALO scan duration of dwell time on a channel: HALO_SCAN_DWELL μsec
2. The interval between HALO scans (time between the start of two consecutive HALO scans): HALO_SCAN_INTVL μsec The TWT parameters requested by the client are denoted as follows:
1. The awake duration as: TWT_DWELL_VAR_REQ× 256 μsec=TWT_SP_DWELL_REQ μsecs (in an embodiment, this value is not changed)
2. The time interval between start of TWT SPs is: TWT_SP_INTVL_REQ μsec TWT agreement logic 125 computes the following outputs:
1. TWT SP suggested start time: TWT_SP_start_time (step 1)
2. TWT SP suggested interval: TWT_SP_INTVL_OUTPUT (step 2)

(Step 1) TWT Start Time Selection (TWT_SP_Start_Time)

Figure 3:
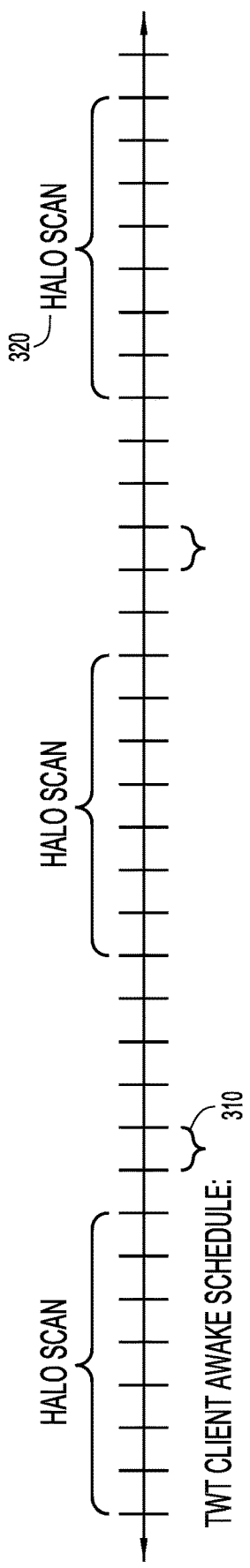
FIG. 3 shows how client awake time may fail to align with a high accuracy location (HALO) scan window in accordance with an example embodiment.

One of the basic problems based on the parameters requested by the client could be that the first TWT wake interval might not be time aligned within a HALO scan window. Further, based on the TWT wake up interval, there is a chance that the TWT awake time might miss some, or in some cases, all the HALO scan windows for extended time periods. This scenario is shown in FIG. 3, which shows how client awake time 310 may fail to align with a HALO scan window 320 in accordance with an example embodiment To alleviate this problem, the first step performed by TWT agreement logic 125 places the start time of the client within a HALO scan such that the placement causes minimal contention with other clients waking up during the scan.

The start time is determined as follows:
1. Let last_tstamp_halo=timestamp of the last HALO scan start time that happened at the AP.
2. Pick a start_time_in_HALO_scan window based on all other selection criteria such as traffic, contention, grouping preference, etc. The range of values will be constrained to between 0 and HALO_SCAN_DWELL minus some minimal overlap interval.
3. Calculate TWT_SP_start_time=last_tstamp_halo+ (S*HALO_SCAN_INTVL)+start_time_in_HALO_scan.

In the equation above, S is used as a configurable integer number that provides sufficient time for the TWT frame exchange to complete and is such that TWT_SP_start_time comes very close to the start time requested by the client.

The selected TWT_SP_start_time parameter places the client awake time at the desired spot in a future HALO scan.

Next, the periodicity of the TWT interval is adjusted by TWT agreement logic 125 to align with the HALO scans.

(Step 2) TWT Interval Selection

In an embodiment, TWT agreement logic 125 is configured to, by default, agree with the awake duration "w" requested by the client. On the other hand, TWT agreement logic 125 is further configured to negotiate the interval "m," based on the following conditions:

1. Agreeing with the client TWT interval m as closely as possible. This allows the client to follow a sleep schedule that is most comfortable to it while meeting the QoS requirements of its application.

2. Selecting the interval m such that it has maximum overlap with the HALO scans.

A closed form solution performed by TWT agreement logic 125 may be as follows:

1. Determine x=(HALO_SCAN_INTVL/TWT_SP_INTVL_REQ)

2. If (Round_power_2(x)>0) then xr=Round_power_2(x) else xr=1 xr=Round_power_2(x) is computed as follows:
when TWT_SP_INTVL_REQ<HALO_SCAN_INTVL: xr is the closest number that is a power of 2;
when TWT_SP_INTVL_REQ>=HALO_SCAN_INTVL: xr is the closest multiple of HALO_SCAN_INTVL 3. Determine the TWT wake interval TWT_SP_INTVL_OUTPUT=(HALO_SCAN_INTVL)/xr.

A numerical example is provided further below.

Figure 4:
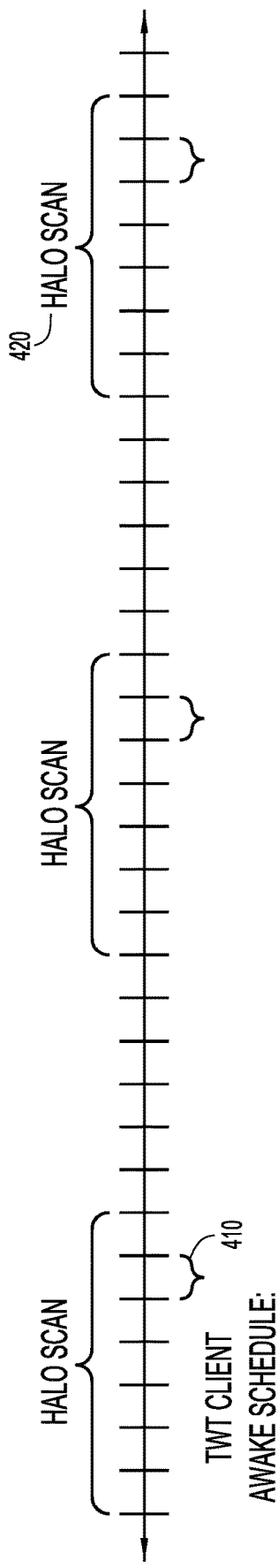
FIG. 4 shows a modified client awake time that align with a HALO scan window in accordance with an example embodiment.

As shown in FIG. 4, the parameters determined as outlined above cause a modified periodic client awake time 410 that aligns with periodic HALO scan windows 420.

(Step 3) Wakeup Interval Bounding Based on Configurable Thresholds

After computing the target TWT interval (TWT_SP_INTVL_OUTPUT) in Step 2, TWT agreement logic 125 calculates:

deviation_from_desired_intvl=(TWT_SP_INTVL_OUTPUT−TWT_SP_INTVL_REQ)

This parameter measures how much the client's requested TWT interval differs from the calculated TWT interval. If this difference is large, there may be a functional impact to the client. More specifically, 1. If deviation_from_desired_intvl>0, this may impact the QoS performance for the client since it will not be able to wake up as frequently as it would like to for receiving traffic.

2. If deviation_from_desired_intvl<0, this may impact the battery life of the client since the desired modification would expect the client it to wake up much more frequently than it desires.

To ensure that client performance is maintained while still effectively determining location, TWT agreement logic 125 applies upper bound (UB) and lower bound (LB) thresholds for deviation_from_desired_intvl.

For example, if it known that the client is a VOIP phone, then it would be more preferable that the client not miss voice packets. In such a case, an UB threshold of UB_VOICE_THRESH_MS=50 msecs might be appropriate. Hypothetically, if in the TWT calculations if deviation_from_desired_intvl=80 msecs, then TWT agreement logic 125 could adjust the wake up interval to wake up more frequently while aligning with the HALO scans.

As another example, if it is known that the client is an Internet of Things (IOT) device and it would be preferable to not want it to wake more frequently than what it asks for, TWT agreement logic 125 might set a LB_IOT_THRESH. In such a case, if deviation_from_desired_intvl=−200 msec, i.e., the TWT calculations suggest asking the client to wake up 200 msec earlier than what it asks for, and LB_IOT_THRESH=−150 msecs, then TWT agreement logic 125 might adjust the TWT wake interval for the client to wake up less frequently.

Example pseudo code for achieving the desired bounding is set forth below.

```
if (deviation_from_desired_intvl > 0) {
// Determine all qualifying upper bound thresholds
// Determine the strictest of upper bound thresholds as UB_THRESH
if ((deviation_from_desired_intvl >= UB_THRESH) && xr >= 2) {
// Round down x as bounded xb var.
// uses same mechanism as Round_power_20( ) above.
xb = Round_down_pow_2(xr)
// Recompute target TWT interval with new xb
TWT_SP_INTVL_OUTPUT = (HALO_SCAN_INTVL) / xb
}
}
```

Similarly,

```
if (deviation_from_desired_intvl < 0) {
// Determine all qualifying lower bound thresholds //
Determine the strictest of lower bound thresholds as LB_THRESH
if (( deviation_from_desired_intvl < LB_THRESH) ) {
// Round down x as bounded xb var.
// uses same mechanism as Round_power_2( ) above.
xb = Round_up_pow_2(xr)
// Recompute target TWT interval with new xb TWT_SP_INTVL_
OUTPUT = (HALO_SCAN_INTVL) / xb
}
}
```

Some example UB and LB thresholds that could be implemented include:

A. UB_ACTIVE_VOICE_CALL_THRESH_MSEC: This threshold is used if the client negotiating TWT has an active voice call.

B. UB_LB_MAC_SPECIFIC_THRESH_MSEC (mac addr, thresh, UB/LB flag): This set of thresholds contains pairs of values for MAC addresses and specific thresholds for each of those MAC addresses.

C. UB_LB_DEVICE_TYPE_THRESH_MSEC (type, thresh): This set consists of pairs of device types and specifics thresholds. For example, TWT agreement logic 125 may classify a client as being a VOIP phone, and a threshold value can be set accordingly, e.g., relatively smaller. These thresholds can also be set as percentages of requested values.

Numerical Example of a TWT Negotiation

The HALO scan parameters are calculated as follows:

1. The HALO scan duration of dwell time on a channel: (HALO_SCAN_DWELL)=120 msec=120000 μsecs 2. The interval between HALO scans (time between the start of two consecutive HALO scans): HALO_SCAN_INTVL=2^25 μsec=33.55 secs=33554432 μsecs The client requests for the parameters of:

1 The client requested time interval between start of TWT SPs is: (TWT_SP_INTVL_REQ)=mantissa*(2^exp)=5*2^21 μsec=10.48 secs=10485760 μsecs (Step 1): Calculation of the TWT SP Start Time 1. Consider last time synchronization function (TSF) reading when HALO scan started=152391

Hence, last_tstamp_halo=152391*1024 μsecs=156048384 μsecs

2. Pick a start_time_in_HALO_scan window based on all other selection criteria such as traffic, contention, grouping preference, etc.

In one implementation the HALO_SCAN_DWELL=200*10^3 μsecs. As such, TWT agreement logic 125 selects an offset of 500 usec into the scan as a start time for the TWT of this client.

Hence, start_time_in_HALO_scan=500 μsecs

3. Calculate TWT SP Start Time
=last_tstamp_halo+(S*HALO_SCAN_INTVL)+start_time_in_HALO_scan.
=156048384+(1*2^25)+500=189603316 μsec From the foregoing, it can be seen that the client awake intervals with such default parameters will not align with the HALO scan intervals—leading to a loss of location accuracy.

In accordance with an example implementation, TWT agreement logic 125 allows the client to maintain its proposed awake duration w=500 μsec.

(Step 2): Calculate Wake Up Interval that would Align with HALO Scans

1. Determine x=(HALO_SCAN_INTVL/TWT_SP_INTVL_REQ)=2 25/(5*2^21)=2^4/5=16/5=3.2 2.

2. If (Round_pow_2(x)>0) then xr=Round_pow_2(x) else xr=1. In this case, xr=4

3. Determine the TWT wake interval TWT_SP_INTVL_OUTPUT=(HALO_SCAN_INTVL)/xr=2^25/2^2=2^23=8388608 μsecs=8.38 secs This value will ensure that the client wakes up at the same deterministic time within every HALO scan.

(Step 3): deviation_from_desired_intvl=8388608−10485760=−2097152 usecs=−2.097 secs The methodology is effectively asking the client to wake up more frequently. If the client was classified as, e.g., an IOT device, and TWT agreement logic 125 is configured to store a parameter LB_IOT_THRESH=700 msecs, then, in this case, TWT agreement logic 125 would further determine: xb=Round_down_pow_2(3.2)=2, and calculate a new TWT_SP_INTVL_OUTPUT=(HALO_SCAN_INTVL)/xb=2^25/2=2^24 μsecs.

This TWT_SP_INTVL_OUTPUT may be expressed as Mantissa=1 and exponent=24.

Those skilled in the art will appreciate that while the embodiments described herein are configured to constrain TWT intervals that are powers of 2, other approaches are possible that result in more granular control of the mantissa.

It should also be noted that the (HALO) scanning interval is synchronized among the APs.

Other Design Considerations

1. Different Clocks in the Network

Referring again to FIG. 1, NTP Server 180 may have a 100 ppm crystal oscillator (XO), while the time synchronization function (TSF) may have an accuracy on the order of <=20 ppm. Ignoring this differential may cause scheduling to regularly drop out of phase, such that TWT no longer aligns with scanning windows. To address this issue, in an embodiment, the TSF of all HALO APs may be aligned to a same clock. In one possible example, the Timesync could be 1588 to a network reference that is better than 20 ppm, or some over the air (OTA) sync. To have the TSF operate in this manner, options include:

using a VCXO to adjust the 802.11 radios;

periodically advancing/retarding the TSF of the radio by a small amount to keep the long term frequency the same and bound the jitter; or keep tearing down the TWT and renegotiating the Phase to align with HALO which may be too intrusive.

2. Selectively Modifying Only 1 TWT Agreement

In accordance with the 802.11ax standard, a client is allowed to have up to 8 TWT agreements. In accordance with an embodiment of TWT agreement logic 125, only one such TWT agreement may be renegotiated to synchronize with the HALO scanning window timing. In the context of voice, for instance, which might want a TWT to go off every 20 ms, when such timing is less than the dwell time margin, there may be no need for adjustment. With a shorter periodic wakeup tied to the rate of packet generation, changing the interval can result in poor utilization.

3. Protocol Specific Information for TWT Agreement Logic

In an embodiment, TWT agreement logic 125 may use the Demand TWT to indicate interest in having the explicit timing requirements met. The client might indicate acceptance or rejection or might propose alternate/dictate TWT. If these alternate parameters align within the computed scan boundaries, TWT agreement logic 125 can accept them (even at the cost of contention, which may be better than a reject). If a client is repeatedly rejecting a Demand TWT, TWT agreement logic 125 may switch to suggest TWT. The AP could also send an unsolicited TWT response frame with the trigger subfield set to 1, using the Alternate or Dictate TWT command with the parameters that it wants the client to send in the TWT request frame.

4. Working with Broadcast TWT Agreements

For broadcast TWT agreements, the AP 120 may advertise TWT wake up time and intervals so that they wake up during HALO scans. TWT agreement logic 125 can have multiple groups such that some groups wake up every beacon interval and have groups with progressively increasing wake up intervals. TWT agreement logic 125 can align and add clients to these groups such that their desired wakeup intervals align with these groups.

5. TWT Agreements Configured Before HALO Scan Information Available

For clients whose TWT agreement is negotiated before HALO scan information is available, location information obtained can be improved by any one or more of: (1) blocking negotiations of TWT when the AP comes up until HALO scan information is available, (2) tearing down older TWT agreements and negotiating new ones that better suit the scans, or (3) until HALO scan information becomes available, responding to explicit TWT agreements only. As a result, at the completion of every TWT service period, TWT agreement logic 125 (operating on, e.g., access point 120) can recommend a wake up time based on HALO information as it becomes available.

In sum, instead of negotiating TWT agreements based purely on the objective of reduction of medium contention and improving client battery life, the embodiments presented herein additionally use HALO scan information available at every AP as a basis for negotiating the TWT agreements. As such, an AP can ensure that the clients are awake and complete a frame exchange with the AP during the HALO scans. In order to achieve this goal, the TWT windows are negotiated with the clients in a manner such that their wake times align with scheduled HALO scans. The HALO scan intervals themselves are also chosen to simplify the alignment problem.

In accordance with the disclosed embodiments, the timing negotiated in TWT agreements are restructured such that:

1. They align in time within HALO scans;

2. They still cause minimal contention within clients during the HALO scans; and 3. They impose a minimal change on a given client's wake up interval such that their wake up times align.

It is noted that there is a tradeoff between a client's quality of service (QoS) performance and battery life impact when the TWT wake up interval is negotiated. In consideration of that tradeoff, embodiments described herein may employ configurable threshold(s) to align TWT wake up intervals based on client types, traffic patterns, MAC addresses, etc. that enable customized TWT negotiations for optimal client performance.

The approaches disclosed herein work with both unicast and broadcast TWT agreements.

Finally, it is noted that it is possible in accordance with the disclosed embodiments to selectively change TWT agreements for clients, i.e., not changing all TWT agreements made by a client. In other words TWT agreement logic may be configured to modify only one out of, e.g., a possible eight TWT agreements that a given client might negotiate.

Figure 5:
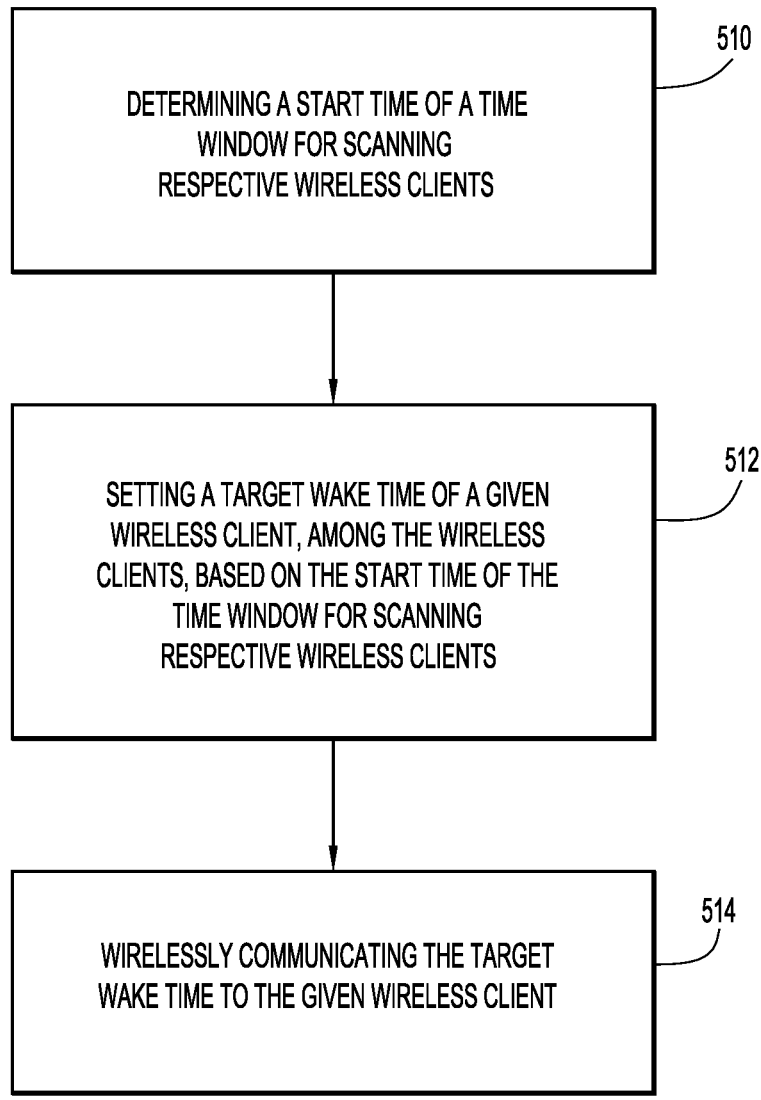
FIG. 5 is a flow chart depicting a series of operations configured to set a target wake time for a wireless client in accordance with an example embodiment.

FIG. 5 is a flow chart depicting a series of operations configured to set a target wake time for a wireless client in accordance with an example embodiment. The operations may be performed by, e.g., an access point. At 510, the operations include determining a start time of a time window for scanning respective wireless clients. Scanning may be for purposes of locating the wireless client. At 512, the operations include setting a target wake time of a given wireless client, among the wireless clients, based on the start time of the time window for scanning respective wireless clients. And, at 514, the operations include wirelessly communicating the target wake time to the given wireless client. It is noted that the access point that may have negotiated the target wake time according to the foregoing operations, need not be the only access point that performs scanning. Rather, other access points may also be involved in scanning operations.

Figure 6:
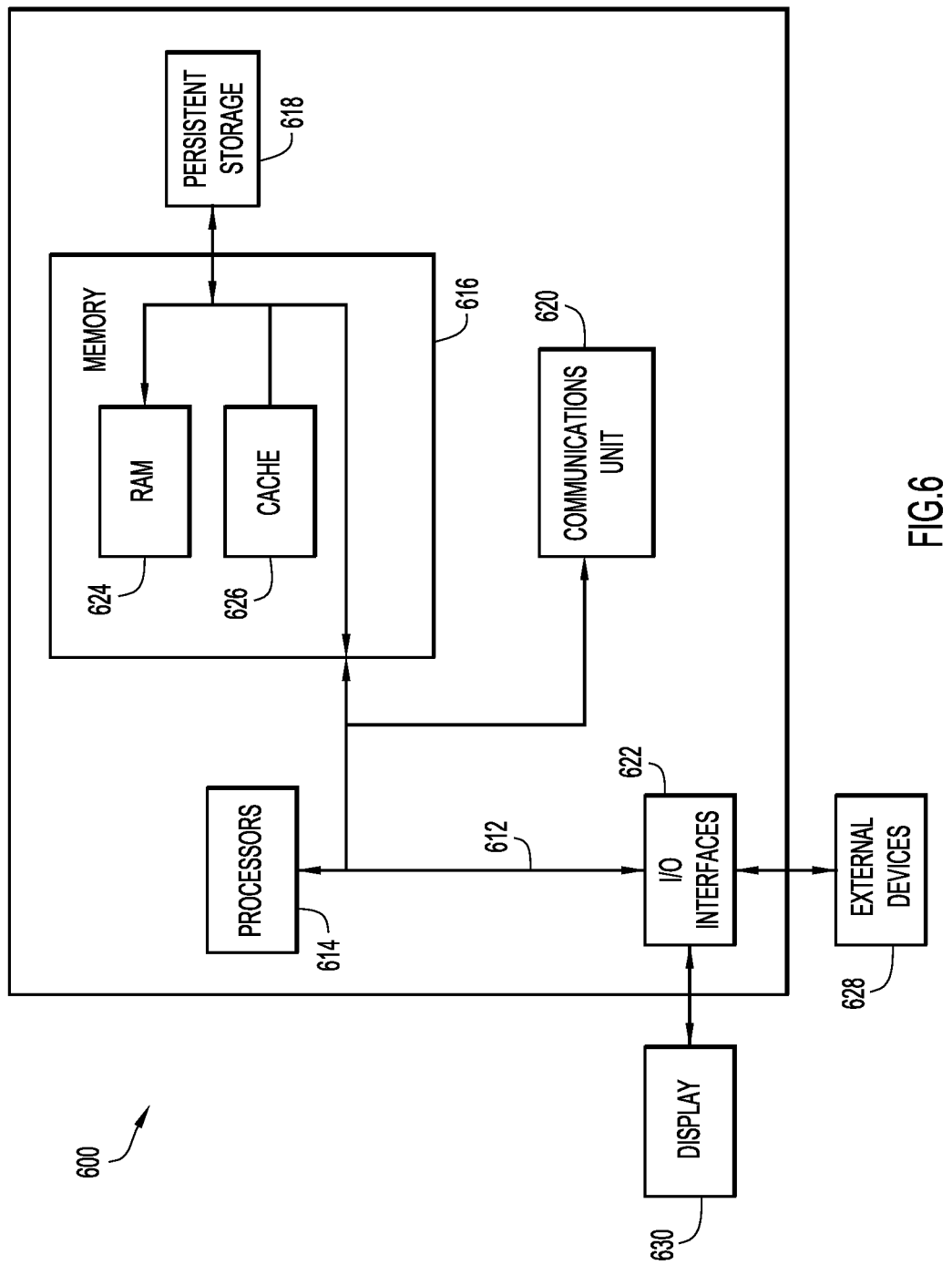
FIG. 6 depicts a device (e.g., an access point or wireless LAN controller) that might host and execute the TWT agreement logic in accordance with an example embodiment.

FIG. 6 depicts a device 600 (e.g., an access point or wireless LAN controller) that might host and execute the TWT agreement logic in accordance with an example embodiment. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media.

One or more programs (e.g., TWT agreement logic 125) may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 614, cause the computing device 600 to perform the operations of an AP 120 or WLC 110 for negotiating TWT agreements with wireless clients 150 described herein in connection with the accompanying figures.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes determining a start time of a time window for scanning respective wireless clients; setting a target wake time of a given wireless client, among the wireless clients, based on the start time of the time window for scanning respective wireless clients; and wirelessly communicating the target wake time to the given wireless client.

In an embodiment, the method further includes setting a periodicity of the target wake time based on a periodicity of the time window for scanning respective wireless clients.

The method may still further include setting the target wake time of the given wireless client, among the wireless clients, based on at least one of an upper bound threshold and a lower bound threshold.

The upper bound threshold may be based on battery life considerations for the given wireless client and the lower bound threshold may be based on quality of service performance considerations for the given wireless client.

In an embodiment, setting the target wake time of the given wireless client may be performed as part of at least one of a unicast target wake time negotiation and a broadcast target wake time negotiation.

In a possible implementation, the given wireless client negotiates multiple target wake time agreements, and wherein setting the target wake time of the given wireless client based on the start time of the time window for scanning respective wireless clients includes modifying a subset of the target wake time agreements based on the start time of the time window for scanning respective wireless clients.

The method may include blocking target wake time agreement negotiation between an access point and the given wireless client until the start time of the time window for scanning respective wireless clients is available at the access point.

The scanning may be for the purpose of locating respective wireless clients.

The method may further include aligning a clock that controls the start time of the time window for scanning respective wireless clients with a clock that controls a timing of awake time of the given wireless client.

In another form, a device may also be provided in accordance with an embodiment. The device may include an interface unit configured to enable network communications; a memory; and one or more processors coupled to the interface unit and the memory, and configured to: determine a start time of a time window for scanning respective wireless clients; set a target wake time of a given wireless client, among the wireless clients, based on the start time of the time window for scanning respective wireless clients; and wirelessly communicate the target wake time to the given wireless client.

The one or more processors may be configured to set a periodicity of the target wake time based on a periodicity of the time window for scanning respective wireless clients.

The one or more processors may also be configured to set the target wake time of the given wireless client, among the wireless clients, based on at least one of an upper bound threshold and a lower bound threshold.

In an embodiment, the upper bound threshold may be based on battery life considerations for the given wireless client and the lower bound threshold may be based on quality of service performance considerations for the given wireless client.

The scanning may be for the purpose of locating respective wireless clients.

In an embodiment, the given wireless client negotiates multiple target wake time agreements, and wherein the one or more processors are configured to set the target wake time of the given wireless client based on the start time of the time window for scanning respective wireless clients by modifying a subset of the target wake time agreements based on the start time of the time window for scanning respective wireless clients.

In still another form, a non-transitory computer readable storage media is provided that is encoded with instructions that, when executed by a processor, cause the processor to determine a start time of a time window for scanning for locations of respective wireless clients; set a target wake time of a given wireless client, among the wireless clients, based on the start time of the time window for scanning for locations of respective wireless clients; and wirelessly communicate the target wake time to the given wireless client.

The instructions may further include instructions that, when executed by a processor, cause the processor to set a periodicity of the target wake time of the given wireless client based on a periodicity of the time window for scanning for locations of respective wireless clients.

The instructions may further include instructions that, when executed by a processor, cause the processor to set the target wake time of the given wireless client, among the wireless clients, based on at least one of an upper bound threshold and a lower bound threshold.

The above description is intended by way of example only. Various modifications and structural changes may be made therein without departing from the scope of the concepts described herein and within the scope and range of equivalents of the claims.

What is claimed is:

1. A method comprising:
   determining a start time of a time window for scanning for locations of respective wireless clients;
   setting a target wake time of a given wireless client, among the wireless clients, based on the start time of the time window for scanning for locations of respective wireless clients to align the target wake time of the given wireless client with the time window for scanning for locations of the respective wireless clients; and
   wirelessly communicating the target wake time to the given wireless client.

2. The method of claim 1, further comprising setting a periodicity of the target wake time based on a periodicity of the time window for scanning for locations of respective wireless clients.

3. The method of claim 2, further comprising setting the target wake time of the given wireless client, among the wireless clients, based on at least one of an upper bound threshold and a lower bound threshold.

4. The method of claim 3, wherein the upper bound threshold is based on battery life considerations for the given wireless client.

5. The method of claim 3, wherein the lower bound threshold is based on quality of service performance considerations for the given wireless client.

6. The method of claim 1, wherein setting the target wake time of the given wireless client is performed as part of at least one of a unicast target wake time negotiation and a broadcast target wake time negotiation.

7. The method of claim 1, wherein the given wireless client negotiates multiple target wake time agreements, and wherein setting the target wake time of the given wireless client based on the start time of the time window for scanning for locations of respective wireless clients comprises modifying a subset of the target wake time agreements based on the start time of the time window for scanning for locations of respective wireless clients.

8. The method of claim 1, further comprising blocking target wake time agreement negotiation between an access point and the given wireless client until the start time of the time window for scanning for locations of respective wireless clients is available at the access point.

9. The method of claim 1, further comprising aligning a clock that controls the start time of the time window for scanning for locations of respective wireless clients with a clock that controls a timing of awake time of the given wireless client.

10. A device comprising:
    an interface unit configured to enable network communications;
    a memory; and
    one or more processors coupled to the interface unit and the memory, and configured to:
      determine a start time of a time window for scanning for locations of respective wireless clients;
      set a target wake time of a given wireless client, among the wireless clients, based on the start time of the time window for scanning for locations of respective wireless clients to align the target wake time of the given wireless client with the time window for scanning for locations of the respective wireless clients; and
      wirelessly communicate the target wake time to the given wireless client.

11. The device of claim 10, wherein the one or more processors are configured to set a periodicity of the target wake time based on a periodicity of the time window for scanning for locations of respective wireless clients.

12. The device of claim 11, wherein the one or more processors are configured to set the target wake time of the given wireless client, among the wireless clients, based on at least one of an upper bound threshold and a lower bound threshold.

13. The device of claim 12, wherein the upper bound threshold is based on battery life considerations for the given wireless client.

14. The device of claim 12, wherein the lower bound threshold is based on quality of service performance considerations for the given wireless client.

15. The device of claim 10, wherein the given wireless client negotiates multiple target wake time agreements, and wherein the one or more processors are configured to set the target wake time of the given wireless client based on the start time of the time window for scanning for locations of respective wireless clients by modifying a subset of the target wake time agreements based on the start time of the time window for scanning for locations of respective wireless clients.

16. A non-transitory computer readable storage media encoded with instructions that, when executed by a processor, cause the processor to:
    determine a start time of a time window for scanning for locations of respective wireless clients;
    set a target wake time of a given wireless client, among the wireless clients, based on the start time of the time window for scanning for locations of respective wireless clients to align the target wake time of the given wireless client with the time window for scanning for locations of the respective wireless clients; and wirelessly communicate the target wake time to the given wireless client.

17. The non-transitory computer readable storage media of claim 16, further including instructions that, when executed by the processor, cause the processor to set a periodicity of the target wake time of the given wireless client based on a periodicity of the time window for scanning for locations of respective wireless clients.

18. The non-transitory computer readable storage media of claim 17, further including instructions that, when executed by the processor, cause the processor to set the target wake time of the given wireless client, among the wireless clients, based on at least one of an upper bound threshold and a lower bound threshold.

* * * * *